May 23, 1939.  W. J. GEIGER ET AL  2,159,736
ELECTRIC LAMP AND METHOD OF MAKING THE SAME
Filed May 22, 1934
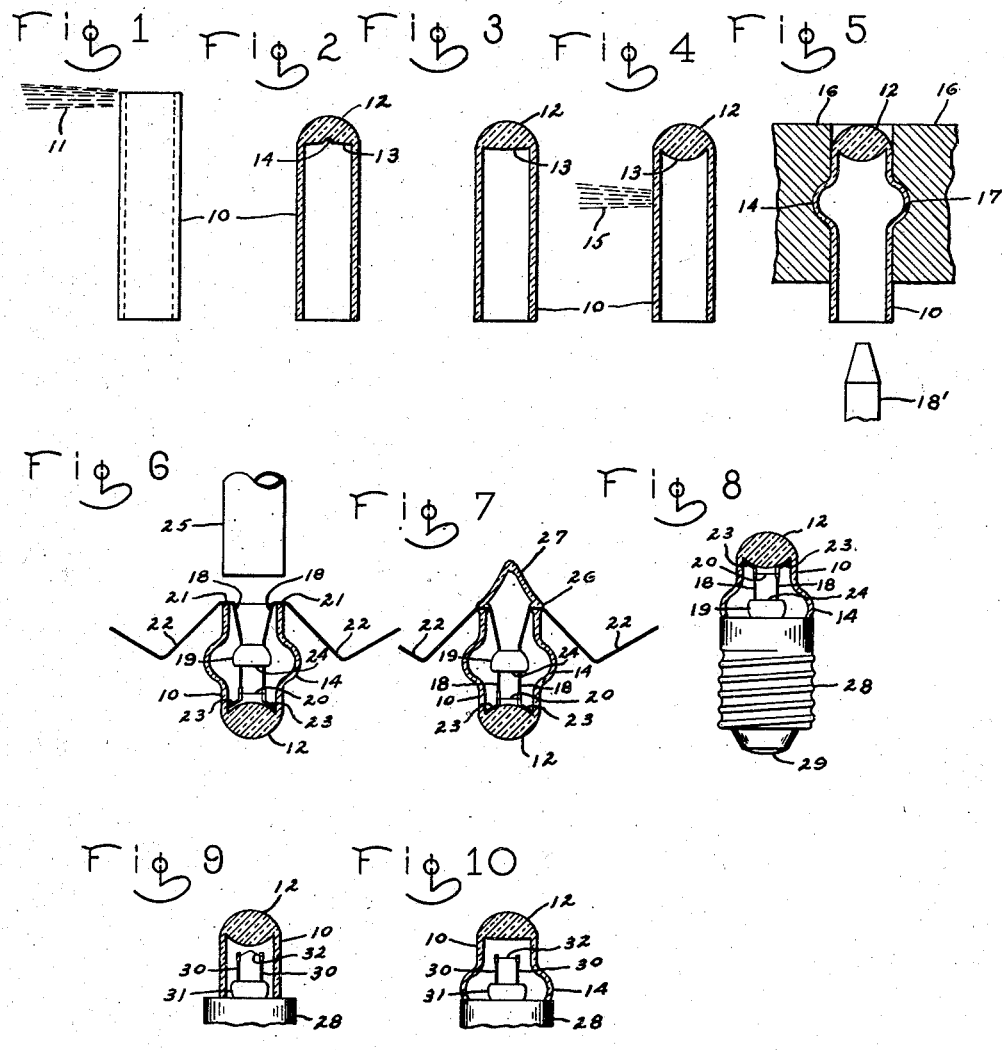
INVENTORS
WALTER J. GEIGER
ALFRED T. GASKILL
BY Harry E. Dunham
THEIR ATTORNEY Patented May 23, 1939

2,159,736

UNITED STATES PATENT OFFICE 2,159,736

ELECTRIC LAMP AND METHOD OF MAKING THE SAME

Walter J. Geiger and Alfred T. Gaskill, Cleveland Heights, Ohio, assignors to General Electric Company, a corporation of New York Application May 22, 1934, Serial No. 726,892

5 Claims. (Cl. 49—84)

Our invention relates to electric incandescent lamps and more particularly to glass bulbs therefor. Still more particularly our invention relates to lamp bulbs comprising a lens portion and to methods of manufacturing the same.

Our invention is particularly adaptable to bulbs for miniature lamps such as those used for flashlight service. According to our invention the lamp bulbs are made from glass tubing preferably by rotating a length of vertically disposed glass tubing about its axis and directing a flame upon the upper end thereof to heat said end sufficiently to cause it to be fused down into a solid mass of glass which acquires a definite lens shape without further shaping. The outer or upper surface of the mass of fused glass acquires a convex shape. The heating may be terminated when the inner or lower surface of said mass of glass is substantially flat or slightly convex, thus producing a substantially plano-convex lens or the heating may be continued until the said inner surface is definitely convex, thus producing a double convex lens. In this manner a double convex lens portion may be produced in which the radii of curvature of the inner and outer surfaces are nearly identical.

Lamp bulbs having a lens portion made according to our method produce a concentrated spot of substantially evenly distributed light which is free from color because of the freedom from shoulders or other imperfections which might give rise to prismatic effects. Our invention also provides a very inexpensive method of manufacturing such lamp bulbs and dispenses with the use of forming tools of any kind.

Further features and advantages of our invention will appear from the following detailed description of species thereof.

In the drawing, Figs. 1-5 illustrate successive steps in the manufacture of a bulb according to our invention; Figs. 6 to 8 illustrate steps in the assembly of the mount structure and the bulb, Fig. 8 being an elevation with the bulb in section, of a completed lamp; and Figs. 9 and 10 are similar views of lamps with modified bulbs.

Referring to Fig. 1, a short length of vertically disposed glass tubing 10 is preferably rotated about its axis and a flame 11 is directed against the upper end thereof. The flame 11 may be rotated and the tube 10 maintained stationary or both may be maintained stationary. The said upper end of tube 10 is fused into a solid mass of glass 12 (Fig. 2) the outer surface of which assumes a convex contour and the inner surface 13 of which is concave at the intermediate stage shown in said Fig. 2 and has an indentation or dimple 14 at the center thereof. Upon further heating the said inner surface 13 becomes substantially plane or slightly convex as shown in Fig. 3, the said dimple being eliminated and thereby forming a substantially plano-convex lens portion. If a lamp bulb having a plano-convex lens is desired, the heating is terminated at this stage. However, the preferred form of lens is the double convex type which is produced as shown in Fig. 4 by further heating of the end of tube 10. The radii of curvature of the inner and outer surfaces of the said lens portion 12 produced in this manner without forming tools may be made substantially identical and a very satisfactory lens thus produced.

In order to provide an annular abutting surface or shoulder for a base shell it is desirable to form an annular protuberance 14 (Fig. 5) on the tube 10. This is done by directing a flame 15 (Fig. 4) on the wall of the rotating tube 10 and then surrounding the heated portion with the two halves 16 of a mold having an annular groove 17 therein and directing air pressure into tube 10 from a nozzle 18' disposed therebelow to blow the said heated tube portion out into the said groove 17. The annular protuberance 14 is preferably spaced from the lens 12 to prevent deformation thereof. The annular protuberance 14 may of course be formed prior to the lens portion 12 by closing off the upper end of the tube 10 when the air pressure is applied or by applying air pressure to both ends of the tube.

The lower end of the bulb 10 may be trimmed to a suitable length after which a mount comprising leading-in wires 18, bead 19 and filament 20 is inserted in the inverted bulb 10 (Fig. 6). The leading-in wires 18 comprise short laterally extending portions 21 which support the said mount on the neck or open end of said bulb 10, and V-shaped outer end portions 22. The particular mount structure illustrated in Figs. 6-8 forms no part of the present invention but is disclosed and claimed in our pending U. S. patent application Serial No. 722,060 filed April 24, 1934, which issued into Patent 1,983,362, December 4, 1934. According to that application the inner ends 23 of the leading-in wires 18 are bent outwardly and the said bent ends are located a definite predetermined distance from the surface 24 of bead 19. The filament 20 is also mounted on the said leading-in wires a definite predetermined distance from said surface 24 of bead 19. The distance from the lateral portions 21 of the leading-in wires 18 is preferably such that the said end portions 23 are disposed a slight distance above the inner surface of the lens portion 12. An exhaust tube 25 is disposed above the bulb 10 in axial alignment therewith. The lower edge of said tube 25 is lowered upon the neck of bulb 10 and a flame is then directed upon the said adjacent edges of said bulb and tube while they are being rotated, thereby fusing said edges together and enclosing the lateral portions 21 of the leading-in wires 18. During the fusion of said bulb 10 and exhaust tube 25, the joint 26 (Fig. 7) therebetween is compressed by forcing down said tube, thereby causing the outwardly bent end portions 23 of leading-in wires 18 to engage the inner surface of the lens portion 12 and locate the filament 20 a definite predetermined distance from the said lens portion. The bulb 10 is evacuated through the exhaust tube 25 which is then tipped off at 27. The lamp may then be completed by mounting a base on the neck portion thereof, the base illustrated in Fig. 8 being of the standard type comprising a screw-threaded shall 28, the upper edge of which abuts against the annular protuberance 14 of bulb 10, and an end contact 29.

In the lamp illustrated in Fig. 9 the bulb 10 is cylindrical in cross section throughout, that is, the annular protuberant portion 14 produced at the step shown in Fig. 5 is omitted. The mount structure consisting of leading-in wires 30, bead 31, and filament 32 is of standard construction.

The double convex lens shown in the lamps in Figs. 8 and 9 is very desirable because the filament may be placed closer to the lens for the same size spot than with other types of lenses and the said lens portion therefore intercepts and concentrates more of the light from said filament. The remaining light from said filament which is transmitted through the wall of the bulb 10 may be controlled by a reflector such as is ordinarily employed in flashlights. The light distribution is also better with a double convex lens than with other types, that is, the distribution of light in the spot produced thereby is more uniform and the spot is remarkably free from color due to the absence of prismatic effects which are caused by shoulders or other irregularities sometimes formed when employing forming tools. The lens portions made according to our method also assume desirable forms because no attempt is made to produce a lens section which is of greater diameter than the tube from which it is made.

The lamp shown in Fig. 10 employs the substantially plano-convex lens 12 which is produced at the stage of manufacture illustrated in Fig. 3. While this form of lens does not appear to be as desirable as the double convex lens, yet it is more desirable than a concavo-convex lens which tends to produce the undesirable color effects hereinbefore referred to.

What we claim as new and desire to secure by Letters Patent of the United States, is:

1. The method of making bulbs for miniature electric lamps which comprises directing a flame upon the upper end of a vertically disposed cylindrical glass tube to heat said end sufficiently to cause it to be fused down into a solid mass of glass which acquires a definite lens shape of the same diameter as said tube and having a convex outer surface without further shaping.

2. The method of making bulbs for miniature electric lamps which comprises rotating a vertically disposed cylindrical glass tube about its axis and directing a flame upon the upper end thereof to heat said end sufficiently to cause it to be fused down into a solid mass of glass which acquires a definite lens shape having a convex outer surface and having a diameter equal to the diameter of said tube.

3. The method of making bulbs for miniature electric lamps which comprises rotating a vertically disposed cylindrical glass tube about its axis and directing a flame upon the upper end thereof to heat said end sufficiently to cause it to be fused down into a solid mass of glass which acquires a definite lens shape having a convex outer surface and having a diameter equal to the diameter of said tube, the heating being continued until the inner surface of said mass of glass assumes a convex contour, thereby producing a double convex lens portion on said upper end of said tube.

4. The method of making bulbs for miniature electric lamps which comprises rotating a vertically disposed cylindrical glass tube about its axis and directing a flame upon the upper end thereof to heat said end sufficiently to cause it to be fused down into a solid mass of glass which acquires a definite lens shape having a convex outer surface and having a diameter equal to the diameter of said tube, the heating being terminated when the inner surface of said mass of glass is substantially plane, thereby producing a plano-convex lens portion on said upper end of said tube.

5. The method of making bulbs for miniature electric lamps which comprises directing a flame against the end of a cylindrical glass tube to heat said end sufficiently to cause it to be fused into a solid mass of glass which acquires a definite lens shape of the same diameter as said cylindrical tube and having a convex outer surface without further shaping.

WALTER J. GEIGER.
ALFRED T. GASKILL.